(12) United States Patent
Roh

(10) Patent No.: US 9,032,245 B2
(45) Date of Patent: May 12, 2015

(54) RAID DATA MANAGEMENT METHOD OF IMPROVING DATA RELIABILITY AND RAID DATA STORAGE DEVICE

(75) Inventor: Kangho Roh, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 224 days.

(21) Appl. No.: 13/517,723

(22) Filed: Jun. 14, 2012

(65) Prior Publication Data
US 2013/0055012 A1 Feb. 28, 2013

(30) Foreign Application Priority Data

Aug. 30, 2011 (KR) ........................ 10-2011-0087121

(51) Int. Cl.
*G06F 11/10* (2006.01)
*G06F 11/20* (2006.01)

(52) U.S. Cl.
CPC .............. *G06F 11/20* (2013.01); *G06F 11/108* (2013.01)

(58) Field of Classification Search
USPC ............. 714/6.22, 6.24, 6.32, 6.1, 6.11, 6.13; 711/104, 114
See application file for complete search history.

(56) References Cited

U.S. PATENT DOCUMENTS

| | | | |
|---|---|---|---|
| 6,988,219 B2 | 1/2006 | Hitz et al. | |
| 8,601,313 B1 * | 12/2013 | Horn | 714/6.32 |
| 2008/0010580 A1 * | 1/2008 | Anderson et al. | 714/763 |
| 2008/0034156 A1 * | 2/2008 | Kawaguchi et al. | 711/114 |
| 2008/0082744 A1 | 4/2008 | Nakagawa | |
| 2010/0017650 A1 * | 1/2010 | Chin et al. | 714/6 |
| 2010/0115183 A1 | 5/2010 | Araki et al. | |
| 2010/0115225 A1 * | 5/2010 | Kim et al. | 711/172 |
| 2011/0066882 A1 * | 3/2011 | Walls et al. | 714/6.24 |
| 2011/0153917 A1 * | 6/2011 | Maita et al. | 711/103 |
| 2012/0079318 A1 * | 3/2012 | Colgrove et al. | 714/6.22 |
| 2012/0254513 A1 * | 10/2012 | Uehara et al. | 711/103 |
| 2012/0317341 A1 * | 12/2012 | So et al. | 711/103 |

FOREIGN PATENT DOCUMENTS

| | | |
|---|---|---|
| JP | 2007-184011 A | 7/2007 |
| JP | 2008-084270 A | 4/2008 |
| JP | 2010-108246 A | 5/2010 |

OTHER PUBLICATIONS

Wikipedia's Flash Memory version from Aug. 28, 2011 http://en.wikipedia.org/w/index.php?title=Flash_memory&oldid=447068271.*

* cited by examiner

*Primary Examiner* — Joseph Schell
(74) *Attorney, Agent, or Firm* — Harness, Dickey & Pierce, P.L.C.

(57) ABSTRACT

A data storage device and a method of managing data in the data storage device to improve data reliability are provided. In the method of managing data, one of control management information about a memory block of nonvolatile memory in which data will be written and control management information about the data are received. A redundant array of independent disks (RAID) parity page ratio is determined according to the control management information. When a data write operation mode is performed, parity data is written in a parity page of the memory block according the RAID parity page ratio. According to some embodiments of the inventive concepts, since a RAID parity page ratio is selectively determined according to control management information, reliability of data is secured or increased.

14 Claims, 14 Drawing Sheets

Fig. 7

| Parity Page Ratio | 0 | 0.78% | 1.56% | 3.13% | 6.25% |
|---|---|---|---|---|---|
| | BLK { EC=1K [D D D D PG D D D] | EC=1K [D D D D D D P PA1] | EC=3K [D D D P PA2 D D D P PA3] | EC=5K [D D P PA4 D D P PA5 D P PA6] | EC=5K [D D P PA7 D D P PA8 D P PA9] |
| | 71 | 72 | 73 | 74 | 75 |
| Error Probability | (1) 1.0e-07 | 8.1e-11 1,230 | 2.0e-11 4,960 | 5.0e-12 20,161 | 1.2e-12 83,333 |

| Logical | Physical |
|---------|----------|
| 0 | . |
| 4 | . |
| 8 | . |
| 12 | . |
| . | . |

Meta

RAID DATA MANAGEMENT METHOD OF IMPROVING DATA RELIABILITY AND RAID DATA STORAGE DEVICE

CROSS-REFERENCE TO RELATED APPLICATIONS

This U.S. non-provisional patent application claims priority under 35 U.S.C. §119 of Korean Patent Application No. 10-2011-0087121, filed on Aug. 30, 2011, the entire contents of which are hereby incorporated by reference.

BACKGROUND

Example embodiments relate to semiconductor devices, and more particularly, to a data management method and/or a data storage device for improving data reliability.

Since a flash memory among nonvolatile memories has a function of electrically erasing cell data in a lump, it has been widely used as memory for computers, solid state disks, memory cards and the like. Recently, as the use of portable information equipment has rapidly increased, flash memory has been widely adopted in data storage devices.

In data storage devices, methods for reducing occurrences of data errors, methods of bad and/or corrupt block management, wear leveling, metadata mirroring and the like are well known.

The methods described above do not have efficient measures to deal with chronic data errors that repeatedly occur in a specific memory block or with an increase in data errors due to repeated use of a data storage device over time.

SUMMARY

At least one example embodiment provides a method of managing data in a data storage device. The method may include receiving one of (1) control management information about a memory block of nonvolatile memory in which data will be written and (2) control management information about the data; determining a redundant array of independent disks (RAID) parity page ratio according to the control management information; and writing parity data in a parity page in the memory block according to the RAID parity page ratio if a data write operation mode is performed.

At least one example embodiment also provides a data storage device. The data storage device may include a nonvolatile semiconductor memory device comprising a plurality of memory blocks comprised of a plurality of pages; and a controller configured to determine a redundant array of independent disks (RAID) parity page ratio according to one of (1) control management information about the memory block in which data will be written and (2) control management information about the data, and the controller configured to write parity data in a parity page in the memory block according to the RAID parity page ratio if a data write operation mode is performed.

At least one example embodiment also provides a method of controlling a redundant array of independent disks (RAID) memory storage. The method may include determining a RAID configuration based on received control management information, the RAID configuration including a RAID parity page ratio; writing data to the RAID memory storage using the RAID configuration; and writing parity data to a portion of the RAID memory storage allocated for parity data based on the RAID parity page ratio.

BRIEF DESCRIPTION OF THE FIGURES

Example embodiments will be more clearly understood from the following brief description taken in conjunction with the accompanying drawings. FIGS. 1-16 represent non-limiting, example embodiments as described herein.

FIG. 1 is a block diagram of a data storage device applied to some embodiments of the inventive concepts.

FIG. 2 is a detailed block diagram illustrating a controller of FIG. 1 according to an example embodiment.

FIG. 3 is a detailed block diagram illustrating a storage of FIG. 1 according to an example embodiment.

FIG. 4 is a detailed block diagram illustrating a redundant array of independent disks (RAID) controller of FIG. 2 according to an example embodiment.

FIG. 5 is a drawing illustrating a general execution of a RAID method applied to some embodiments of the inventive concepts.

FIG. 6 is a drawing illustrating storage of parity data when applying the RAID method in accordance with FIG. 5.

FIG. 7 is a drawing illustrating a variation of error probability in accordance with a parity page ratio when applying the RAID method in accordance with FIG. 5.

FIG. 8 is a drawing illustrating a data management method of a RAID controller in accordance with some embodiments of the inventive concepts.

FIG. 9 is a flow chart of the data management method of FIG. 8.

FIG. 10 is a drawing illustrating an example embodiment in which an erase count value of a memory block is used as control management information in FIG. 9.

FIG. 11 is a drawing illustrating an example embodiment in which the frequency of error occurrence in a memory block is used as control management information in FIG. 9.

FIG. 12 is a drawing illustrating an example embodiment in which metadata of a memory block in FIG. 9 is used as control management information in FIG. 9.

FIG. 13 is a drawing illustrating an example embodiment in which a host command of a memory block is used as control management information in FIG. 9.

FIG. 14 is a block diagram illustrating an application example of the inventive concepts applied to a data storage device.

FIG. 15 is a block diagram illustrating another application example of the inventive concepts applied to a fusion memory system.

FIG. 16 is a block diagram illustrating another application example of the inventive concepts applied to a computing system.

Figure 1:
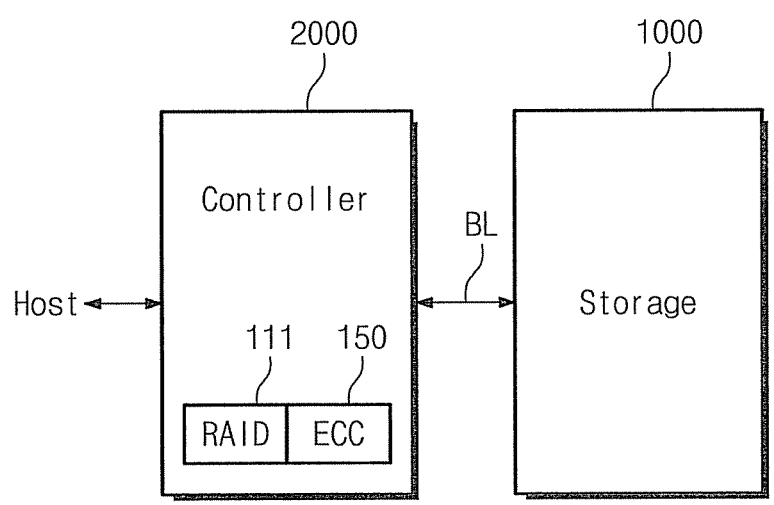

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

Example embodiments will now be described more fully with reference to the accompanying drawings, in which example embodiments are shown. Example embodiments may, however, be embodied in many different forms and should not be construed as being limited to the embodiments set forth herein; rather, these embodiments are provided so that this disclosure will be thorough and complete, and will fully convey the concepts of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a block diagram of a data storage device applied to some embodiments of the inventive concepts.

Referring to FIG. 1, the data storage device includes a storage 1000 and a controller 2000.

The storage 1000 may be used to store data information having various types of data like a text, a graphic, a software code or the like. The storage 1000 may be, for example, an electrically erasable programmable read-only memory (EEPROM), a flash memory, a magnetic random access memory (MRAM), a spin-transfer torque MRAM, a conductive bridging RAM (CBRAM), a ferroelectric RAM (FRAM), a phase change RAM (PRAM) that is also called an ovonic unified memory (OUM), a resistive RAM (RRAM), a nano tube RRAM, a polymer RAM, a nano floating gate memory (NFGM), a holographic memory, a molecular electronics memory device or an insulator resistance change memory. Memory cells may constitute the storage 1000 and may store one-bit data or two-bit or more data. However, nonvolatile memories applied to the storage 1000 may not be limited thereto. The storage 1000, like FIG. 3, may be a NAND flash memory that may include a plurality of memory blocks comprising a plurality of pages.

The controller 2000 may determine a redundant array of independent disks (RAID) parity page ratio according to management control information for a memory block in which data will be written. The controller 2000 may control information on the data and may write parity data in a parity page in the memory block according to the RAID parity page ratio when a data write operation is performed. The controller 2000, as illustrated in FIG. 1, may include a RAID block 111 and an (error correcting code) ECC block 150, for example.

The controller 2000 may control the storage 1000 in response to an external request provided from a host. The controller 2000 may utilize data compression methods to compress data provided from the host and store the compressed data in the storage 1000. The data compression method may more effectively utilize the storage 1000 (for example, by storing large amounts of data at a low cost) and may reduce traffic of the bus BL.

RAID (redundant array of independent/inexpensive disk) techniques are well known and are mainly adopted in a server storing important data. In RAID techniques, when there are several hard disks, same data may be stored in every hard disk and may be stored together with parity information to restore data when the data is lost. In some example embodiments, RAID techniques may increase reliability of data being written but a RAID parity page ratio may be flexibly determined according to control management information.

In the case of a data storage device fitted with a comparatively small capacity meta memory, only requested metadata among all the metadata stored in the storage 1000 may be loaded in a meta memory (e.g., buffer memory or RAM) of the controller 2000. That is, because of a limited capacity of meta memory, the metadata loaded corresponding to previous write data may be unloaded and metadata corresponding to current write data may be loaded.

The metadata may be important data to manage the storage 1000 such as a flash memory and may include at least one of a file data name, a name of directory that relates to file data, a right of access to file data and time information that file data is generated, for example. Also, the metadata may include state information about a block and page area that may be used in the storage 1000.

To guarantee and/or increase a reliability of data stored in a memory block in which errors frequently occur and erase operations are frequently performed, the controller 2000 of FIG. 2 may be constituted as follows.

Figure 2:
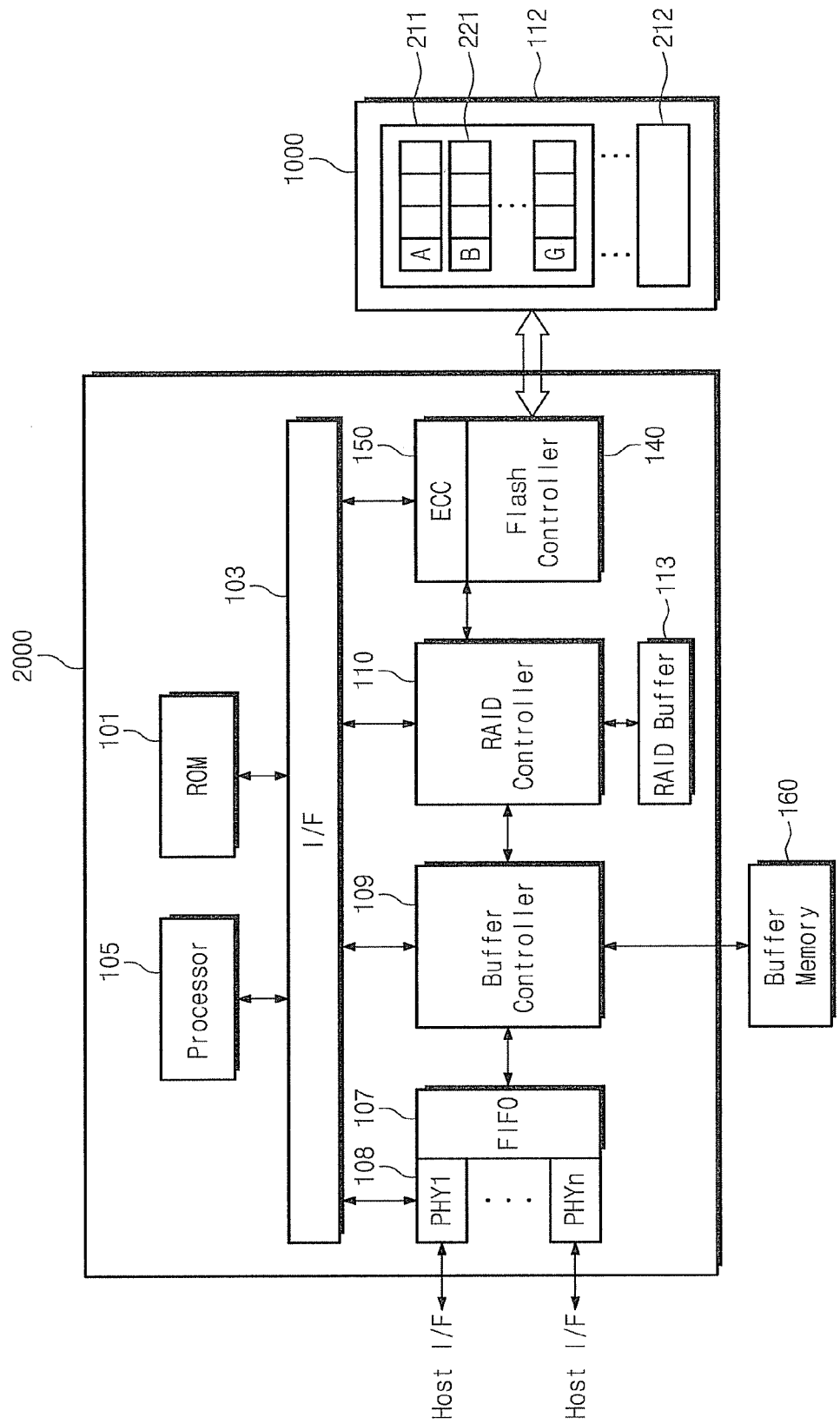

FIG. 2 is a detailed block diagram illustrating a controller of FIG. 1.

Referring to FIG. 2, the controller 2000 may include a read only memory (ROM) 101, a processor 105, an internal interface 103, a buffer controller 109 that may be connected to a buffer memory 160, a RAID controller 110, a RAID buffer 113, an ECC block 150 and a flash controller 140.

The RAID controller 110 and the RAID buffer 113 may be included in the RAID block 111 of FIG. 1.

The internal interface 103 may be configured to interface with the storage 1000 and every functional block of the controller 2000.

The processor 105 may be configured to control an operation of the controller 2000. The processor 105 may be configured to operate firmware such as a flash translation layer (FTL) stored in the ROM 101, for example. The flash translation layer FTL may be used to manage mapping information. However, a function of the flash translation layer FTL may not be limited thereto. The flash translation layer FTL may also manage wear-leveling, bad blocks, and data preservation due to an unexpected power loss, for example.

The buffer memory 160 may temporally store data transferred from the outside or from the storage 1000.

Physical chips 108 PHY1-PHYn in FIG. 2 may be connected between the internal interface 103 and a host interface. A (first in first out) FIFO memory 107 may be connected to the buffer controller 109 to perform a function of first input first output.

The RAID controller 110 and the flash controller 140 may be connected to each other to cause a write operation to be performed in a memory block 211 of the storage 1000 when the RAID is in a write operation mode.

According to some example embodiments, a RAID parity page ratio may be determined by control management information about a memory block (BLK of FIG. 10) in which data will be written and control management information about the data. Thus, when a data write operation mode is performed, parity data may be written in parity pages P10, P20, P21, P30, P31 and P32 in the memory block according to the determined RAID parity page ratio. In FIG. 2, the storage 1000 may include a memory block 211, which may include a page 221.

Figure 10:
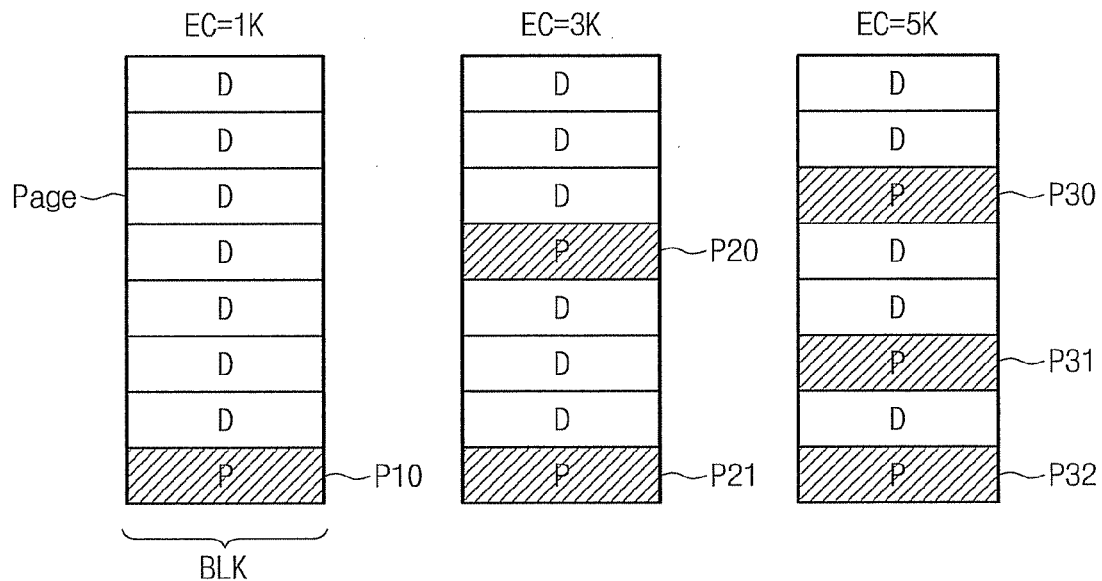

According to some example embodiments, the control management information about the memory block used to determine the RAID parity page ratio may include an erase count value of the memory block as illustrated in FIG. 10.

Figure 11:
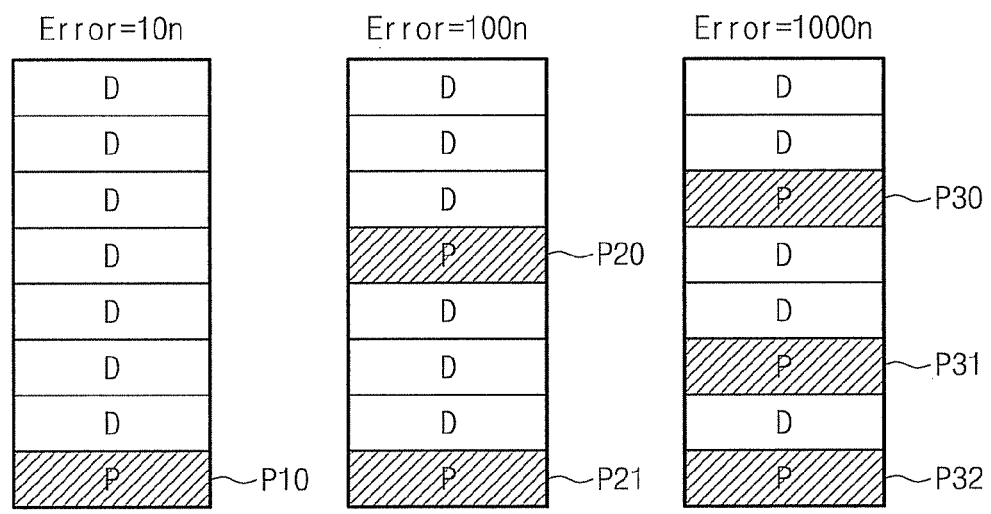

According to some example embodiments, the control management information about the memory block used to determine the RAID parity page ratio may include error occurrence frequency information of the memory block as illustrated in FIG. 11.

Figures 12, 13:
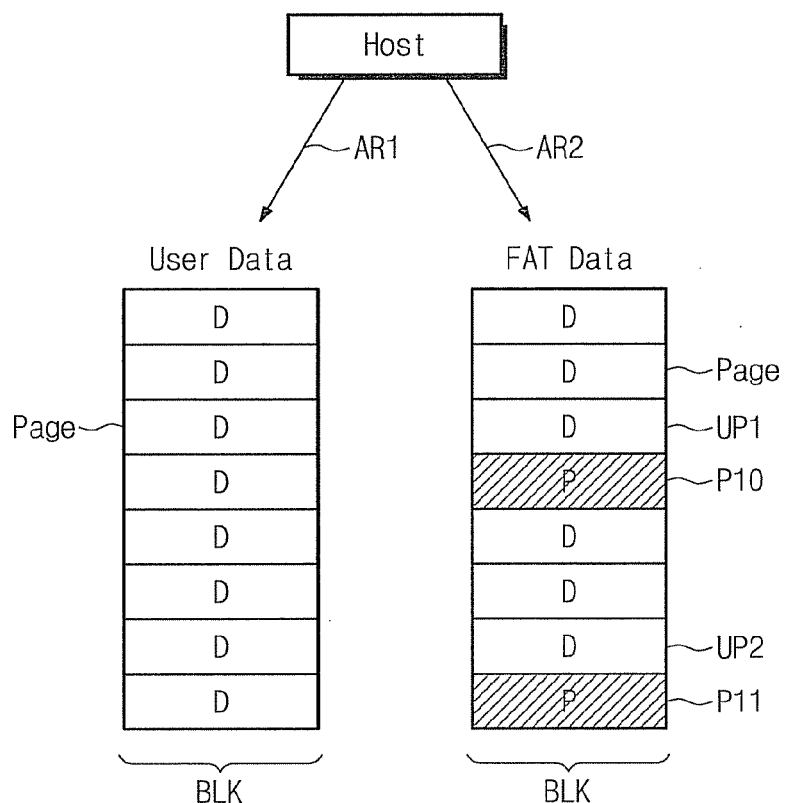

According to some example embodiments, the control management information about the memory block used to determine the RAID parity page ratio may include a host command about a state of the data as illustrated in FIG. 13.

According to some example embodiments, the control management information about the memory block used to determine the RAID parity page ratio may include information that may distinguish whether the data is user data or metadata as illustrated in FIG. 12.

When a RAID write operation is performed, a data reliability may be secured or increased based on the determined number of pages one parity page is assigned, which may be based on the control management information.

Figure 3:
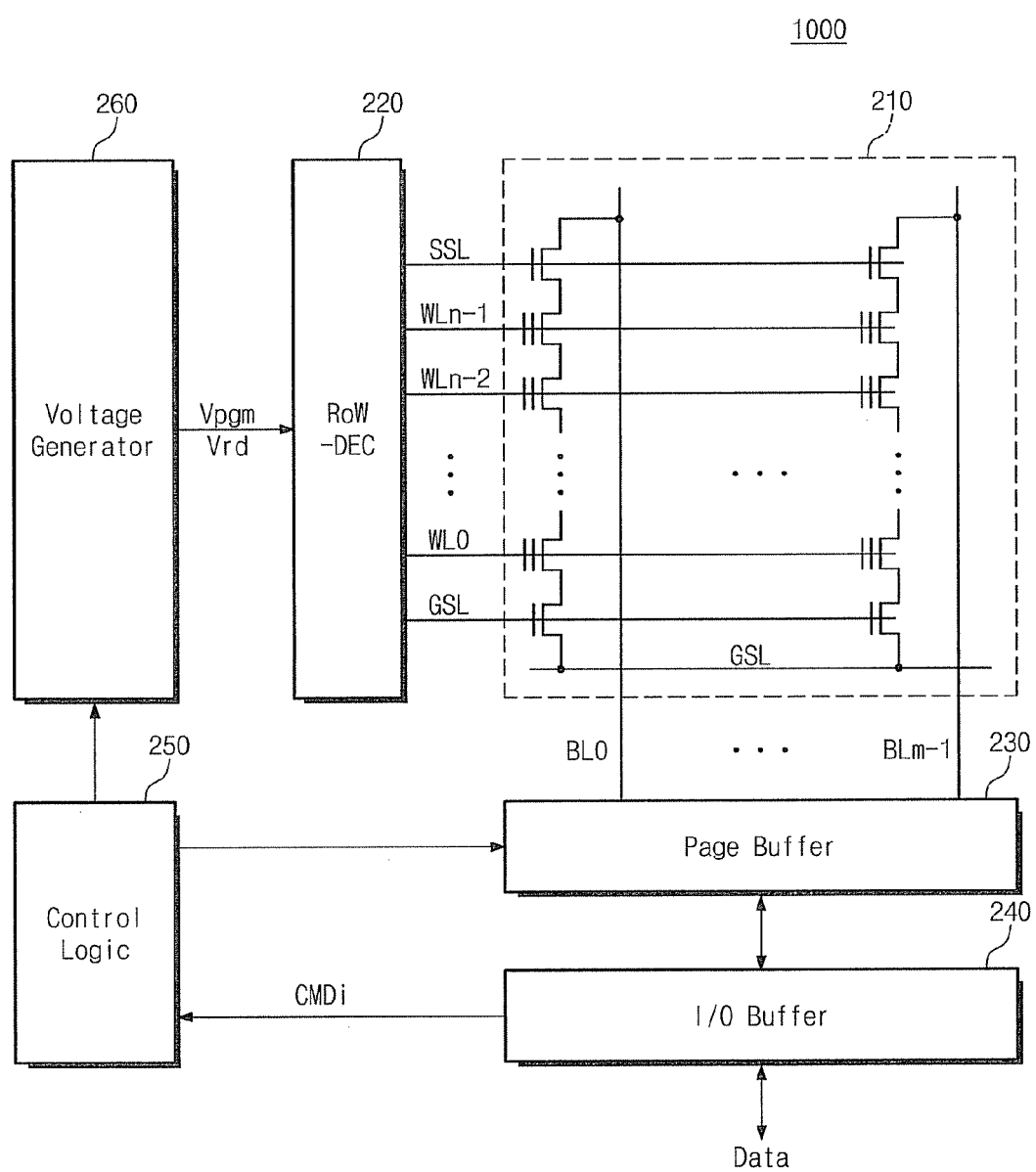

FIG. 3 is a detailed block diagram illustrating a storage of FIG. 1 according to an example embodiment.

Referring to FIG. 3, the storage 1000 may be embodied by a flash memory, which may include a memory cell array 210, a row decoder 220, a page buffer 230, an I/O buffer 240, control logic 250 and a voltage generator 260.

The memory cell array 210 may include a plurality of memory cells that may be connected to bit lines and word lines. The memory cell array 210 may include a main area in which a message field of write data (program data) may be stored and a spare area in which control information of the message field may be stored. Write data may be stored as a plural number of memory cells connected to one word line. In particular, in a memory device including multi-level cells, write data may be stored as the plural number of memory cells connected to one word line.

The row decoder 220 may be configured to select a word line in response to a row address. The row decoder 220 may transfer various word line voltages (e.g., Vpgm, Vrd, etc.) that may be provided from the voltage generator 260 to selected word lines. When a program operation (i.e., write) is performed, the row decoder 220 may transfer a program voltage Vpgm between 15-20V, for example, and a verification voltage Vfy to a selected word line and transfer a pass voltage Vpass to an unselected word line. When a read operation is performed, the row decoder 220 may provide a first read voltage Vrd to a selected word line and provide a second read voltage Vread of about 5V, for example, to an unselected word line.

The page buffer 230 may operate as a write driver or a sense amplifier depending on an operation mode. The page buffer 230 may operate as a sense amplifier in a read operation mode and as a write driver in a program operation mode. When a program operation is performed, the page buffer 230 may load data of one page unit. That is, the page buffer 230 may receive data to be programmed through the input/output buffer 240 and store the received data in a latch contained therein. When writing (programming) the loaded data, the page buffer 230 may provide a ground voltage (e.g., 0V) to a bit line of memory cells being programmed. The page buffer 230 may provide a precharge voltage (e.g., Vcc) to a bit line of memory cells being program-inhibited.

The input/output buffer 240 may temporally store an address or write data inputted through an input/output pin (I/O pin). The input/output buffer 240 may transfer the stored address to an address buffer (not illustrated), the stored program data to the page buffer 230 and the stored command to a command register (not illustrated). When a read operation is performed, read data provided from the page buffer 230 may be output to the outside through the input/output buffer 240.

When a program operation is performed, the control logic 250 may receive a command CMDi provided from the controller 2000 and control the page buffer 230 and the voltage generator 260 so that program data is written in a selected memory cell. The control logic 250 may control the page buffer 230 and the voltage generator 260 so that data of selected cell region is read in response to a command of the controller 2000.

Figure 4:
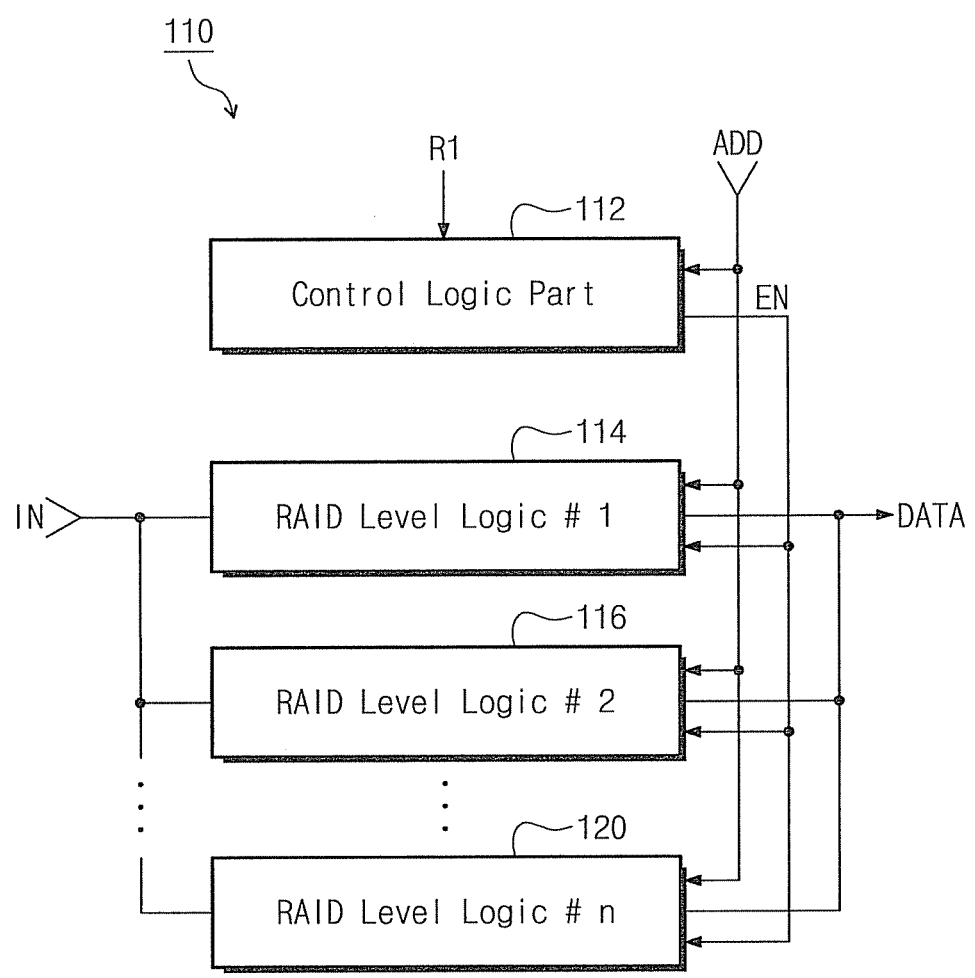

FIG. 4 is a detailed block diagram illustrating a RAID controller of FIG. 2 according to an example embodiment.

Referring to FIG. 4, the RAID controller 110 may include control logic 112 and a plurality of RAID level logics 114, 116, . . . and 120. The control logic 112 and the plurality of RAID level logics 114, 116, . . . and 120 may be embodied by hardware, (e.g., the hardware in which software is embedded).

Each of the RAID level logics 114, 116, and 120 may support a different RAID level. The different RAID level may be one RAID level or a RAID level such that two or more RAID levels are merged.

Each of the plurality of RAID level logics 114, 116, . . . and 120 may convert input data and an input address received through the input terminal IN so that the received input data and the input address may be suitable for its RAID level and may transfer the converted input data and the converted input address to the flash controller 140 of FIG. 2. The flash controller 140 may receive the converted input data and the converted input address to access at least one way.

The first RAID level logic 114 may be embodied by logic to support a RAID level 1, the second RAID level logic 116 may be embodied by logic to support a RAID level 3 or a RAID level 5 and the last RAID level logic 120 may be embodied by logic to support a RAID level 0+1, for example.

When an access operation is performed, the processor 105 may read RAID level information R1 that may be stored in the ROM 101 in response to an access command output from the host. The processor 105 may transfer the read RAID level information R1 to the control logic 112 of the RAID controller 110. Thus, the control logic 112 may enable one of the RAID level logics 114, 116, . . . and 120 according to an address ADD and the RAID level information R1.

According to some example embodiments, when one of the RAID level logics is selected, a parity page ratio assignment may vary according to the control management information. In FIG. 10, a parity page P is assigned to a memory block having the greatest number of erasure times by 3 pages P30, P31 and P32 and a parity page P is assigned to a memory block having the least number of erasure times by 1 page P10.

Figure 5:
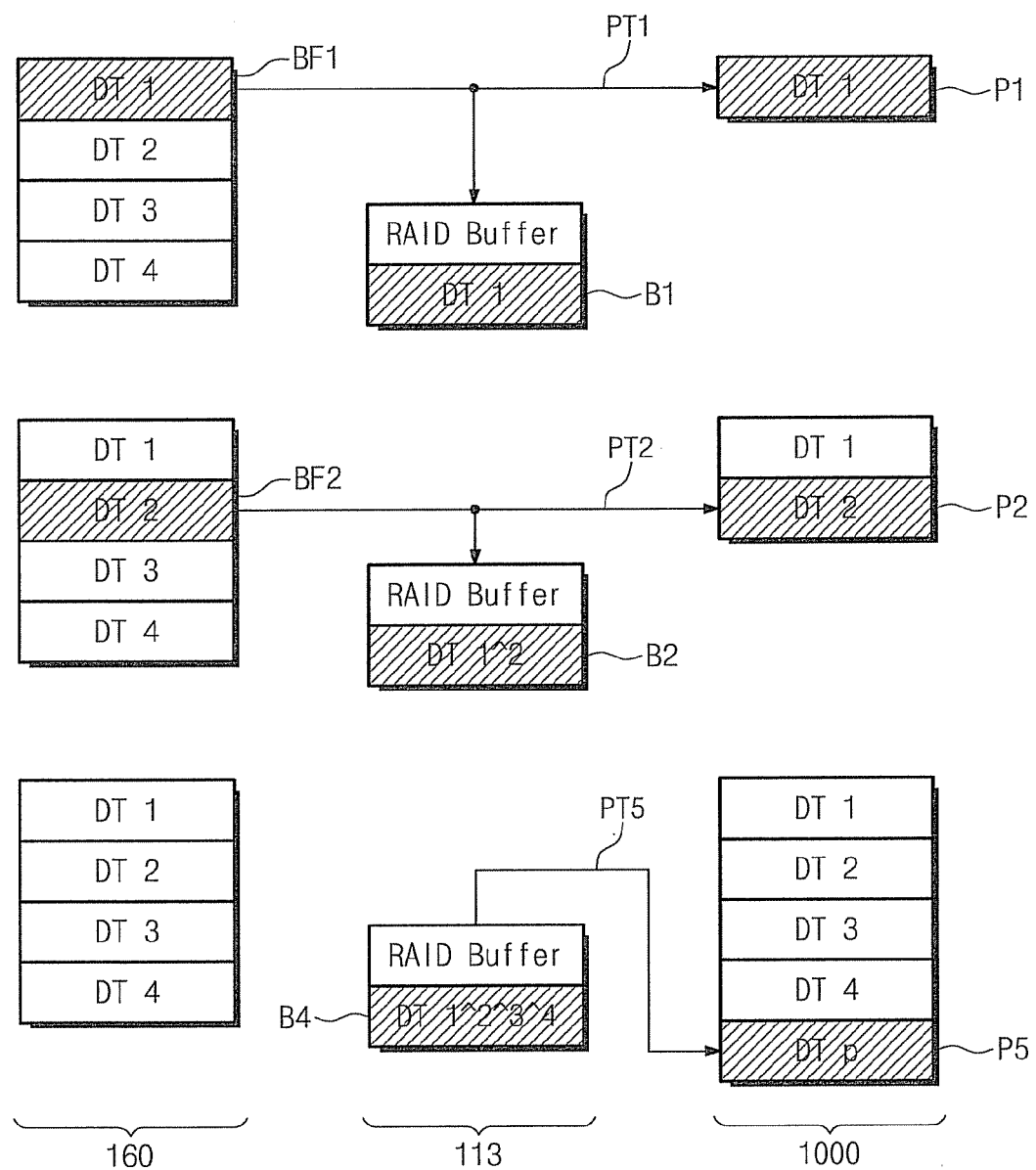
Figure 6:
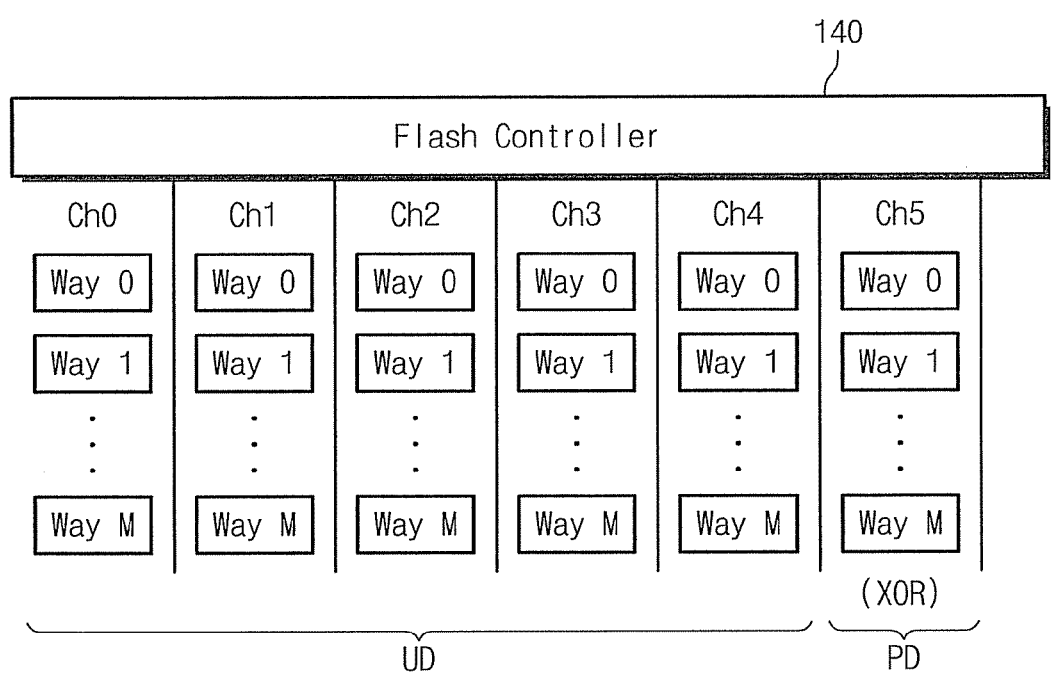

FIG. 5 is a drawing illustrating a general execution of a RAID method applied to some embodiments of the inventive concepts. FIG. 6 is a drawing illustrating storage of parity data when applying the RAID method in accordance with FIG. 5. FIG. 7 is a drawing illustrating a variation of error probability in accordance with a parity page ratio when applying the RAID method in accordance with FIG. 5.

As illustrated in FIG. 5, large amounts of storage device may be provided to a NAND flash memory having pages P1, P2 and P5 as data storage space at relatively lower cost. However, the frequency of data error occurrence may be higher than that of other memories. Thus, when writing data, the ECC block may be used. However, an error beyond the range that the ECC block guarantees may frequently occur. If a data error occurs in an important user data, file system data or a FTL mapping, restoration of the data may be difficult.

Methods of reducing data error occurrence may include bad block management, wear-leveling and metadata mirroring.

The methods described above have a difficulty to meet an issue that an error relatively occurs more in a specific memory block or an issue that an error occurrence is increased because of using a data storage device for a long period.

Therefore, according to some example embodiments, when a RAID operation is performed as shown in FIG. 5, parity page ratio assignment may be flexibly controlled according to control management information.

Referring to FIG. 5, the buffer memory 160 (comprising static random access memory (SRAM) and/or dynamic random access memory (DRAM)), the RAID buffer 113 and the storage 1000 are illustrated. Data DT1 stored in a first area BF1 of the buffer memory 160 may be written in a first page P1 in a specific memory block of the storage 1000 through a path PT1. Data DT2 stored in a second area BF2 of the buffer memory 160 may be written in a second page P2 in a specific memory block of the storage 1000 through a path PT2.

According to an operation of the RAID controller 110, exclusive OR information of the data DT1 and the data DT2 may be stored in a storage area B2 of the RAID buffer 113. When a specific period arrives or when a controller (or firmware) issues a command, the exclusive OR information stored in a storage area B4 (e.g., DT1 XOR DT2 XOR DT3 XOR DT4) of the RAID buffer 113 may be stored in a parity page P5 of the storage 1000.

The parity page P5 may be stored in the same memory block as the memory block in which data DT1, DT2, DT3 and DT4 are stored and/or may also be stored in another memory block or other space.

According to a write operation using the RAID technique described above, even if an error were to occur in any one of the pages DT1, DT2, DT3 and DT4, data may be restored.

If controlling the frequency of storing parity data generated by the RAID controller, a stability of data or reliability of data may vary depending on the controlled frequency.

If an error probability of a given page is 1.0e-6, an error occurrence probability may vary depending on a RAID parity page ratio as shown in FIG. 7. Referring to FIG. 7, five memory blocks 71, 72, 73, 74 and 75 are illustrated. The memory block 72 has one parity page PA1 at intervals of 128 pages unlike the memory block 71. In this case, an unrecoverable error occurrence probability may be reduced by $\frac{1}{1230}$. The memory block 73 has two parity pages PA2 and PA3 at intervals of 128 pages unlike the memory block 71. In this case, an unrecoverable error occurrence probability may be reduced by $\frac{1}{4960}$. As the memory block has more parity pages, an error occurrence probability may be further reduced as illustrated by memory blocks 74 and 75.

According to some example embodiments, a RAID parity page ratio may be determined by the control management information.

Referring to FIG. 6, an example of parity data storage is illustrated when using the RAID technique in accordance with FIG. 5. In FIG. 6, the flash controller 140 stores user data UD and parity data PD by channel depending on a RAID level 5 (striped set with distributed parity or interleave parity) provided from the RAID controller 110. The parity data is constituted by XOR information, which is comparative information of data.

Besides the RAID level 5 illustrated in FIG. 6, any one configuration of a RAID level 0 (striped set without parity or striping), a RAID level 1 (mirrored set without parity or mirroring), a RAID level 2 (hamming code parity), a RAID level 3 (striped set with dedicated parity, bit interleaved parity or byte level parity), a RAID level 4 (block level parity), a RAID level 6 (striped set with dual distributed parity), a RAID level 7, a RAID level 10 and a RAID level 53 may be embodied in example embodiments. According to another example embodiment, a configuration of RAID level mixed with at least two RAID levels selected from the above RAID levels may be embodied.

Figure 8:
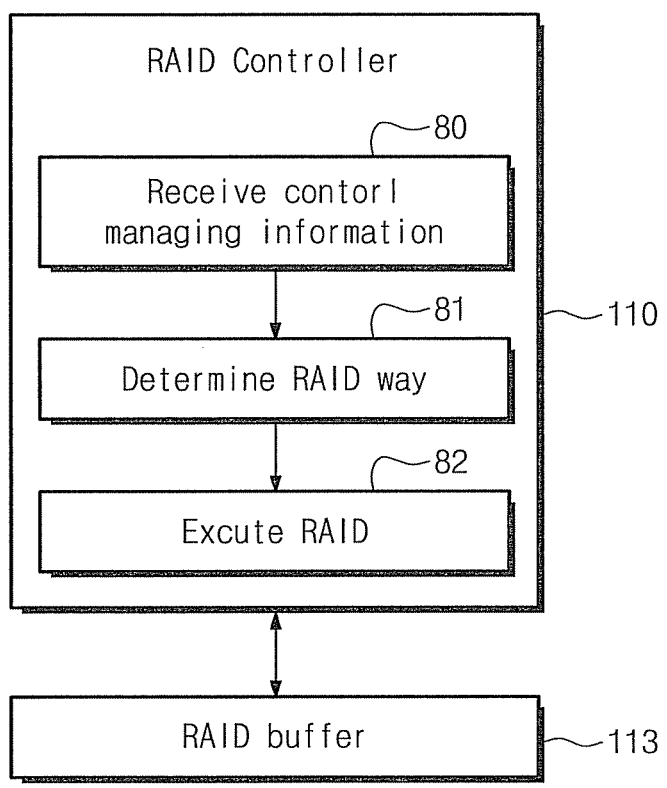
Figure 9:
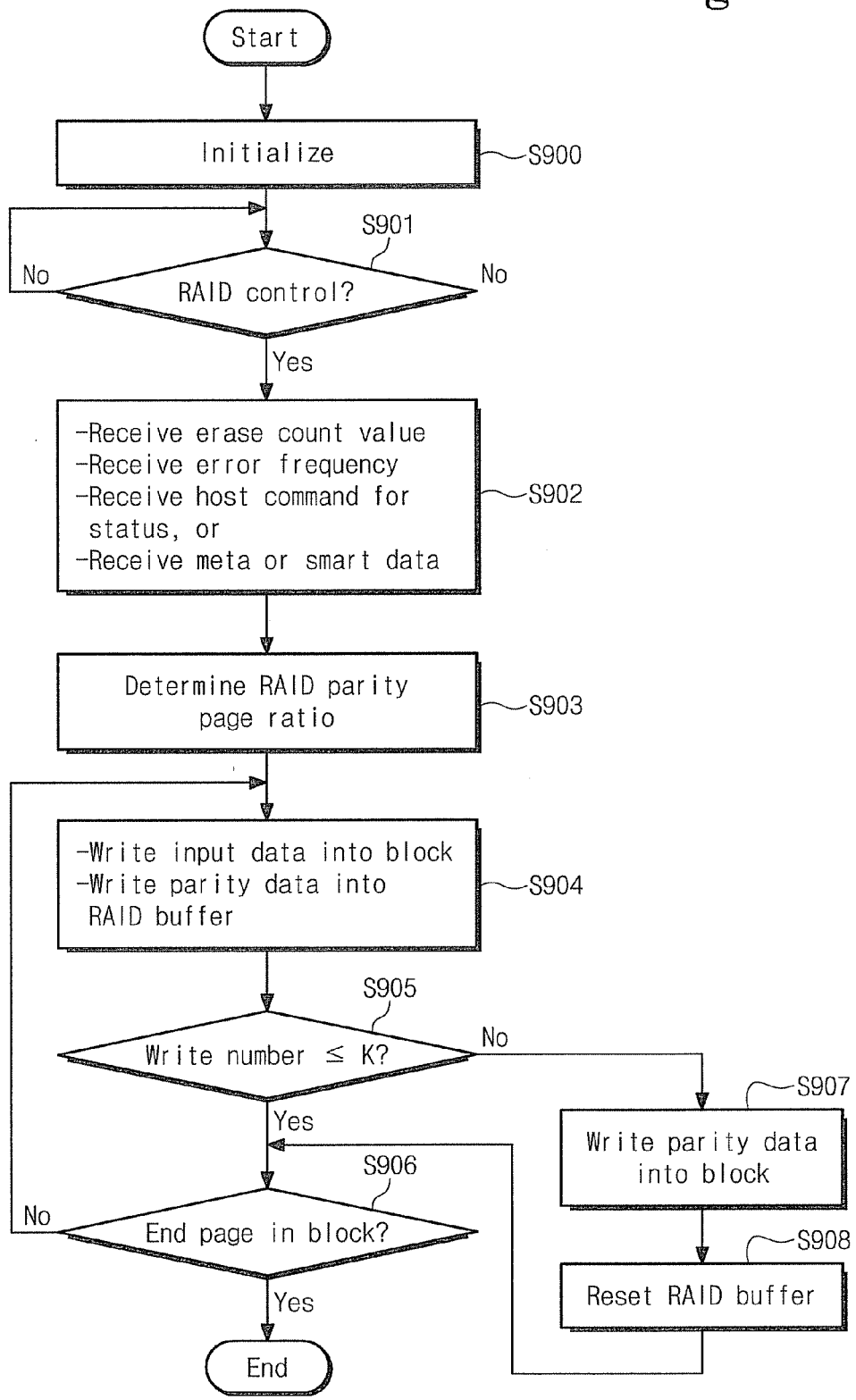

FIG. 8 is a drawing illustrating a data management method of a RAID controller in accordance with some embodiments of the inventive concepts. FIG. 9 is a flow chart of the data management method of FIG. 8. FIG. 10 is a drawing illustrating an example embodiment in which an erase count value of a memory block is used as control management information in FIG. 9. FIG. 11 is a drawing illustrating an example embodiment in which the frequency of error occurrence in a memory block is used as control management information in FIG. 9. FIG. 12 is a drawing illustrating an example embodiment in which metadata of a memory block is used as control management information in FIG. 9. FIG. 13 is a drawing illustrating an example embodiment in which a host command of a memory block is used as control management information in FIG. 9.

Referring to FIG. 8, a control sequence for a data management method of the RAID controller 110 is illustrated. The RAID controller 110 may receive control management information about a memory block of nonvolatile memory in which data may be written and control management information about the data in a step 80. The RAID controller 110 may determine a RAID way in a step 81, which may include determining a RAID parity page ratio. That is, if one of RAID levels is selected, a RAID parity page ratio may be determined by the control management information.

If a RAID parity page ratio is determined by the control management information, a write operation based on the RAID may be executed in a step 82. That is, parity data stored in the RAID buffer 113 may be written in a parity page in the memory block.

In FIG. 9, an initialization is executed in step S900. After an initialization is executed, a determination may be made whether RAID control will be performed in step S901. The determination of step S901 may include, for example, checking an external option that may include a user selection or an automatic execution program performance when data reliability is important.

In step S902, control management information that relates to a memory block of nonvolatile memory in which data may be written and control management information about the data may be received.

The control management information about the memory block may include, for example, an erase count value of the memory block, an error occurrence frequency information of the memory block, a host command about an important state of the data, information distinguishing whether the data is user data or metadata, or information distinguishing whether the data is user data or smart data.

In step S903, a RAID parity page ratio is determined according to the control management information. That is, the number of page intervals at which parity data is written in a page of flash memory may be determined.

In step S904, input data may be written in a selected page of the selected memory block, and parity data may be written in a storage area B1 of the RAID buffer 113.

In step S905, a determination is made whether a write number of a data page is less than or equal to K (K is a natural number). K may be calculated as a ratio of number of data pages to the number of parity pages for the respective interval in a memory block. The write number of a data page may be an incremental count of a page of a block being written to. If, for example, the memory block has two parity pages at intervals of 128 pages, the K becomes 64. Thus, in the above example, the parity data may be stored and maintained in a storage area B4 of the RAID buffer 112 before the write number of the data page becomes 64.

In step S906, a determination is made whether a page in which data is being written is an end of the memory block. If the page is not an end page in the memory block, step S904 may be executed again so that other data may be written in a next page.

In step S905, if a write number of the data page is greater than K, a RAID operation of storing the parity data (e.g., from RAID buffer 113) to a parity page of the memory block may be executed in step S907.

In step S908, the RAID buffer is reset after a write of parity data is completed and a write number of a data page may be reset.

Referring to FIG. 10, an example embodiment is illustrated where parity data may be written depending on an erase count value (EC) of a memory block BLK. Since a memory block having an erase count value of 5k (k is kilo) has a high error occurrence probability as compared with a memory block having an erase count value of 1k, more parity pages may exist as shown in parity pages P30, P31 and P32, for example. Since a memory cell may become increasingly unstable as an erase count value increases, the number of parity pages may be controlled accordingly.

Referring to FIG. 11, an example embodiment is illustrated where parity data is written depending on an error occurrence frequency of a memory block BLK. A memory block in which errors occurred a thousand times may have a high probability of error occurrence as compared with a memory block in which errors occurred a hundred times. Thus, as shown in the example embodiment, parity pages P30, P31 and P32 may be assigned to the memory block having 1000 number of error occurrences. Relatively more parity pages may exist in a memory block in which errors may occur more frequently. Since as the frequency of error occurrences increase, a memory cell becomes increasingly unstable, the number of parity pages may be controlled considering that as a parameter.

If data being input is metadata, it may be managed to be more important than user data. As illustrated in FIG. 12, in the case that metadata is provided as write data, more parity pages may be assigned as compared with user data.

Referring to FIG. 13, the number of parity pages may be controlled by a type of host command. When the host command represents a write of FAT data as shown in an arrow AR2, parity data may be written in parity pages P10 and P11 in memory block BLK. When storage of important data is required on the basis of a host command, the number of parity pages may increase.

As described above, since a RAID parity page ratio is selected by the control management information, reliability of data may be guaranteed and/or increased.

Figure 14:
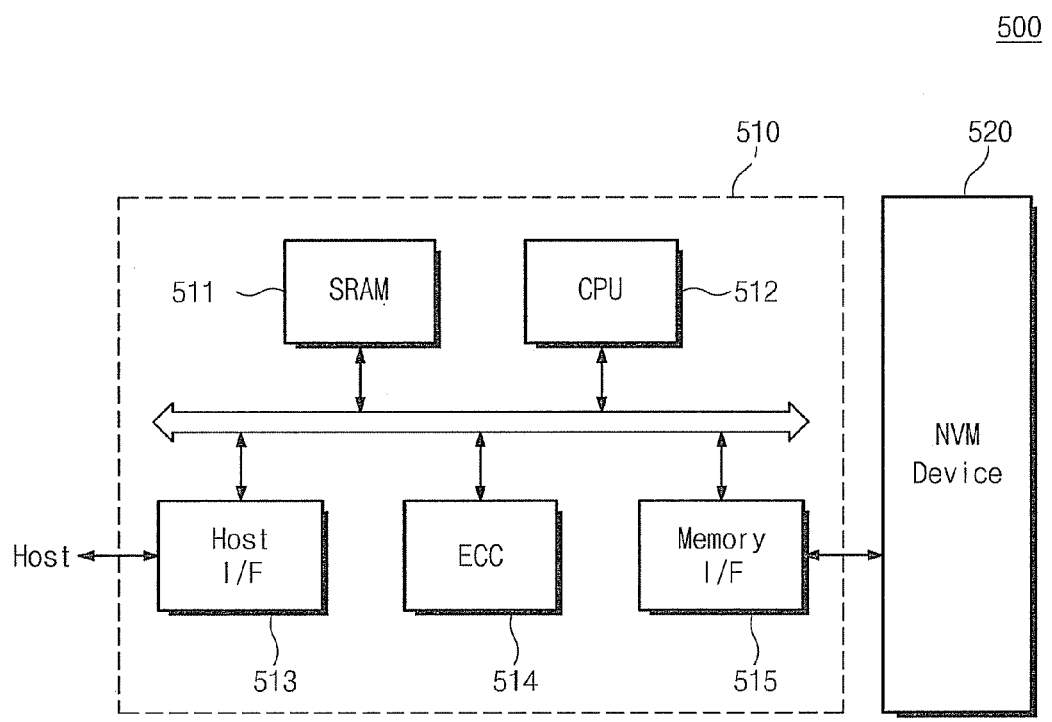

FIG. 14 is a block diagram illustrating an application example of the inventive concepts applied to a data storage device.

Referring to FIG. 14, a data storage device 500 may include a nonvolatile memory device 520 and a memory controller 510. The nonvolatile memory device 520 may be embodied, for example, as a flash memory described in FIG. 3.

The memory controller 510 may control the nonvolatile memory device 520 through a memory interface 515. A memory card or a solid state disk (SSD), for example, may be provided by combination of the nonvolatile memory device 520 and the memory controller 510.

An SRAM 511 in the memory controller 510 may be used as an operational memory of central processing unit 512. A host interface 513 may perform an interface between the data storage device 500 and a host and may include an exchange protocol. An error correction block 514 may detect and correct an error that may be included in data received from the host and/or read from the nonvolatile memory device 520. The memory interface 515 may interface with the nonvolatile memory device 520.

The central processing unit 512 may perform control operations for data exchange of the memory controller 510. Although not illustrated in the drawing, the data storage device 500 may further include a ROM (not illustrated) that may store code data for interfacing with the host and/or nonvolatile memory 520. The nonvolatile memory device 520 may be, for example, a multi-chip package comprising a plurality of flash memory chips.

When the nonvolatile memory device 520 includes a plurality of memory blocks comprising a plurality of pages, the memory controller 510, which may include a firmware or a software in the central processing unit 512, may determine a RAID parity page ratio depending on control management information about the memory block in which data may be written and control management information about the data. When a data write operation is performed, parity data may be written in a parity page in the memory block according to the RAID parity page ratio.

Since the data storage device 500 may selectively determine a RAID parity page ratio according to control management information, a storage stability of data being stored may be superior, and thereby reliability of data may be guaranteed and/or increased.

A SSD may include a flash memory like FIG. 3 storing metadata. In this case, the memory controller 510 may be configured to communicate with the outside (e.g., host) through one of various interface protocols such as, for example, universal serial bus (USB), multimedia card (MMC), peripheral component interconnect express (PCI-E), serial advanced technology attachment (SATA), parallel advanced technology attachment (PATA), small computer system interface (SCSI), enhanced small device interface (ESDI) and integrated drive electronics (IDE).

Figure 15:
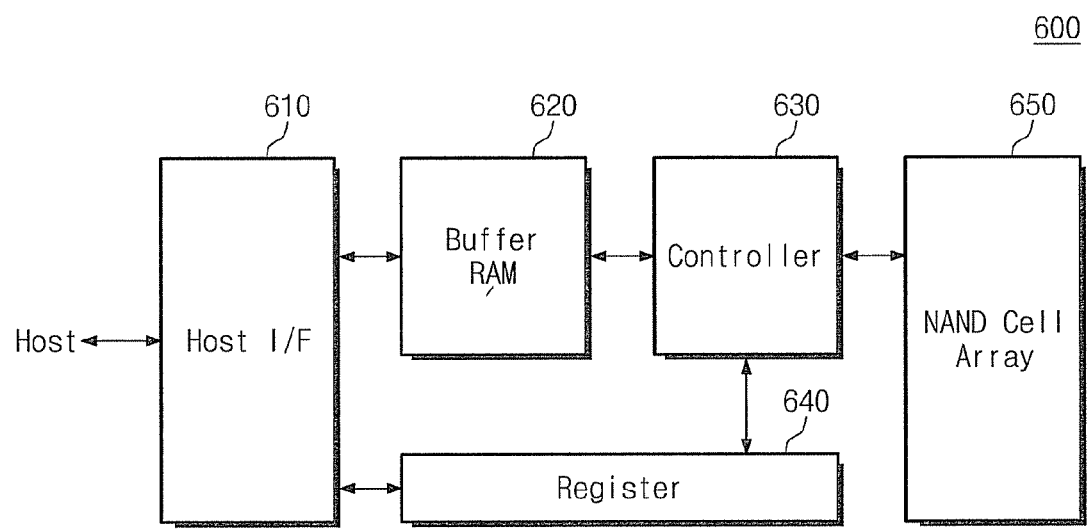

FIG. 15 is a block diagram illustrating another application example of the inventive concepts applied to a fusion memory system.

For example, a oneNAND flash memory device 600 may be applied as a fusion memory device or a fusion memory system.

The oneNAND flash memory device 600 may include a host interface 610 that may exchange information with a device using a different protocol; a buffer RAM 620 that may include a code to drive the memory device or temporally store data; a controller 630 that may control a read operation, a write operation and all the states in response to a control signal and a command provided from the outside; a register 640 that may store a command, an address and data such as configuration defining an internal system operation environment of the memory device 600; and a NAND flash cell array 650 that may include a nonvolatile memory cell and a page buffer.

In response to a request from a host, the oneNAND flash memory device 600 may perform a stable data write operation in accordance with example embodiments.

The NAND flash cell array 650 may include a plurality of memory blocks comprising a plurality of pages. The controller 630 may determine a RAID parity page ratio in accordance with control management information by an internal firmware or an internal software, and may write parity data in a parity page in the memory block according to the determined ratio.

Similarly, since the oneNAND flash memory device 600 may selectively control a RAID parity page ratio according to various control management information, a storage stability of data being stored by the oneNAND flash memory device 600 may increase and/or be improved.

Figure 16:
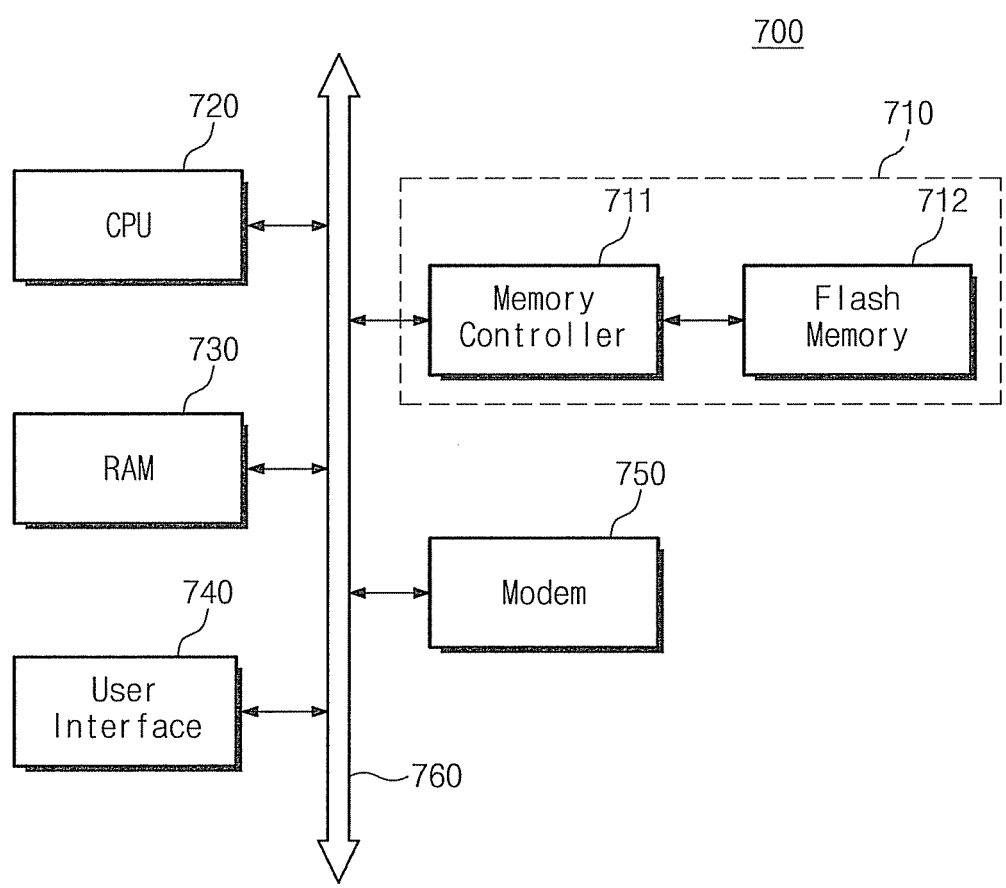

FIG. 16 is a block diagram illustrating another application example of the inventive concepts applied to a computing system.

Referring to FIG. 16, a computing system 700 may include a CPU 720, a RAM 730, a user interface 740, a modem 750 including a function of baseband chipset and a memory system 710 including a memory controller 711 and a flash memory 712 that may be electrically connected to a system bus 760.

The memory system 710 may be configured as the data storage device 500 or the flash memory device 600 illustrated in FIG. 14 and FIG. 15, respectively.

When the computing system 700 is a mobile device, a battery (not illustrated) may provide an operating voltage of the computing system 700. In the case of mobile device, the CPU 720 may be a multi-processor type to perform multi-processing operations. In that case, it may not be necessary to install the RAM 730 in each processor, and thus, the RAM 730 may internally have a multi-port and a shared memory area so that the RAM 730 may be used in common by processors.

The memory controller 711 may determine a RAID parity page ratio depending on control management information about the memory block in which data may be written and control management information about the data. When a data write operation mode is performed, the memory controller 711 may write parity data in a parity page in the memory block of the flash memory 712 according to the determined RAID parity page ratio.

Thus, since the computing system 700 may determine a RAID parity page ratio according to control management information such as the erase number of a memory block or the frequency of error occurrence, for example, reliability of data being stored may be guaranteed and/or increased.

Although not illustrated in the drawing, the computing system 700 may further include, for example, an application chipset, a camera image processor CIS, a mobile DRAM, or the like. The memory system 710 may be embodied by a SSD using a nonvolatile memory to store data. Also, the memory system 710 may be provided as a fusion flash memory (e.g., oneNAND flash memory).

The flash memory and/or the memory controller may be mounted using various types of packages. For example, the flash memory and/or the memory controller may be mounted by various types of packages including, for example, PoP (package on package), ball grid array (BGA), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), thin quad flatpack (TQFP), system in package (SIP), multi-chip package (MCP), wafer-level fabricated package (WFP) and wafer-level processed stack package (WSP).

According to some example embodiments, since a RAID parity page ratio is determined depending on control management information, reliability of data may be guaranteed and/or increased.

While example embodiments have been particularly shown and described, it will be understood by one of ordinary skill in the art that variations in form and detail may be made therein without departing from the spirit and scope of the claims.

What is claimed is:

1. A method of controlling a redundant array of independent disks (RAID) memory storage comprising:
   determining a RAID configuration based on control management information, the RAID configuration including a RAID parity page ratio;
   writing data to the RAID memory storage using the RAID configuration; and
   writing parity data to a portion of the RAID memory storage allocated for parity data based on the RAID parity page ratio, wherein the writing parity data includes,
      calculating a parity page interval as a ratio of a number of data pages to a number of parity pages represented as a whole number, the number of parity pages being based on the RAID parity page ratio,
      checking whether a write number of a data page is less than or equal to the parity page interval, and
      resetting the write number of the data page in response to the writing parity data.

2. The method of claim 1, wherein the control management information comprises an erase count value of a memory block.

3. The method of claim 2, wherein the RAID parity page ratio is directly proportional to the erase count value of the memory block.

4. The method of claim 1, wherein the control management information comprises error occurrence frequency information of a memory block.

5. The method of claim 4, wherein the RAID parity page ratio is directly proportional to the error occurrence frequency of the memory block.

6. The method of claim 1, wherein the control management information is a host command.

7. The method of claim 1, wherein the control management information is information distinguishing whether the data is user data or metadata.

8. The method of claim 1, wherein the control management information is information distinguishing whether the data is user data or data about a reliability of the RAID memory storage.

9. The method of claim 1, wherein the RAID memory storage includes a nonvolatile NAND flash memory.

10. The method of claim 1, wherein the parity data is comparative information of data stored in a RAID buffer.

11. The method of claim 1, wherein the RAID parity page ratio is determined based on at least one of an erase count value of a memory block, an error occurrence frequency of the memory block, an importance of the data, and a host command.

12. The method of claim 11, further comprising:
   determining whether the data includes metadata.

13. The method of claim 11, further comprising:
   determining the erase count value of the memory block.

14. The method of claim 11, further comprising:
   determining the error occurrence frequency of the memory block.

* * * * *